Patented Aug. 16, 1938

2,127,090

UNITED STATES PATENT OFFICE 2,127,090

INSECTICIDE

Lloyd E. Smith, Washington, D. C.

No Drawing. Application February 26, 1937,
Serial No. 127,942

2 Claims. (Cl. 167—30)

(Granted under the act of March 3, 1883, as
amended April 30, 1928; 370 O. G. 757)

This application is made under the act of March 3, 1883, as amended by the act of April 30, 1928, and the invention described herein, if patented, may be manufactured and used by or for the Government for governmental purposes without the payment to me of any royalty thereon.

I hereby dedicate the invention herein described to the free use of the People of the United States to take effect on the granting of a patent to me.

This invention relates to improvements in materials for destroying or checking the growth or multiplication of living organisms, whether plant or animal, which are economically injurious to man.

An object of the invention is to provide a material suitable for use as an insecticide.

Another object of the invention is to provide a material which is relatively non-toxic to man and domestic animals when taken by mouth and which can be used in place of lead arsenate and other arsenicals for destroying insects without leaving a harmful residue on fruits and vegetables.

I have found that the esters of organic acids and especially the nitrated tolyl esters of organic acids, which are prepared by any one of several known methods, are materials which are very effective in killing many species of insects whether applied externally or internally; that these organic products may be sprayed or dusted upon delicate foliage without injuring it; that these materials are as effective as lead arsenate and other commonly used insecticides and that they are relatively non-toxic to warm blooded animals. Suitable products, according to this invention, are 4,6-dinitro-o-tolyl acetate, 4,6-dinitro-o-tolyl benzoate and 4,6-dinitro-o-tolyl-mono-chloracetate. It is to be understood that these compounds are named specifically only as examples and that it is apparent to any one skilled in the art that a great many derivatives and substituted products are possible and fall within the class of compounds covered by this application.

One of the preferred compounds comprised in my invention is 4,6-dinitro-o-tolyl acetate. It occurs as colorless crystals melting at 96° C. It is insoluble in water but soluble in organic solvents. It may be reduced to impalpable powder by grinding and applied to vegetation either dry as a dust or wet as a spray. The compound may also be applied as a component of an oil emulsion spray. When applied as a spray in water it is desirable to incorporate an effective wetting agent such as one of the so-called sulphonated oils.

The value of the class of compounds described above can be illustrated by the following tests using 4,6-dinitro-o-tolyl acetate as an example:

1. Upon mosquito larvae in aqueous solutions 4,6-dinitro-o-tolyl acetate was very toxic.

2. In laboratory tests upon codling moth larvae, 4,6-dinitro-o-tolyl acetate in water suspension at a concentration of two pounds to fifty gallons of water gave 73.8 per cent of clean fruit. Under the same conditions lead arsenate gave only 53.5 per cent of clean fruit.

3. The use of this same material against the tobacco hornworm resulted in a mortality of 80 per cent with very little feeding on the host plant.

Having thus described my invention, what I claim for Letters Patent is:

I claim:

1. An insecticide containing as its essential active ingredient a dinitrated tolyl ester of an organic acid.

2. An insecticide containing as its essential active ingredient 4,6-dinitro-o-tolyl acetate.

LLOYD E. SMITH.